(12) United States Patent
Brady

(10) Patent No.: US 10,894,913 B1
(45) Date of Patent: Jan. 19, 2021

(54) SURFACE BLOCKING AGENTS

(71) Applicant: National Technology & Engineering Solutions of Sandia, LLC, Albuquerque, NM (US)

(72) Inventor: Patrick V. Brady, Sandia Park, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 176 days.

(21) Appl. No.: 16/058,332

(22) Filed: Aug. 8, 2018

Related U.S. Application Data

(60) Provisional application No. 62/545,654, filed on Aug. 15, 2017.

(51) Int. Cl.
*E21B 43/20* (2006.01)
*C09K 8/58* (2006.01)

(52) U.S. Cl.
CPC ............ *C09K 8/58* (2013.01); *E21B 43/20* (2013.01); *C09K 2208/10* (2013.01)

(58) Field of Classification Search
None
See application file for complete search history.

(56) References Cited

U.S. PATENT DOCUMENTS

| | | | | |
|---|---|---|---|---|
| 4,217,958 A | * | 8/1980 | Doster | C09K 8/584 166/270.1 |
| 2017/0015896 A1 | * | 1/2017 | Cox | C09K 8/588 |

OTHER PUBLICATIONS

Brady, P. V. et al., "A surface complexation model of oil-brine-sandstone interfaces at 100° C.: Low salinity waterflooding," Journal of Petroleum Science and Engineering (2012) 81:171-176.
Brady, P. V. et al., "Surface Complexation Modeling for Waterflooding of Sandstones," SPE Journal (2013) 18(2): 214-218.
Brady, P. V. et al., "Electrostatics and the low salinity effect in sandstone reservoirs," Energy & Fuels (2015) 29:666-677.
Brady, P. V. et al., "Functional Wettability in Carbonate Reservoirs," Energy & Fuels (2016) 30:9217-9225.
Dubey, S. T. et al., "Base Number and Wetting Properties of Crude Oils," SPE Reservoir Engineering (1993) 8(3):195-200.

* cited by examiner

*Primary Examiner* — Andrew Sue-Ako
(74) *Attorney, Agent, or Firm* — Daniel J. Jenkins

(57) ABSTRACT

Injectates and method that use surface blocking agents for enhancing subterranean oil recovery are disclosed. The surface blocking agents reduce the adhesion of oil to rock surfaces thereby increasing oil recovery. The surface blocking agents attach to or are attracted to the oils positive nitrogen sites and have an opposing negative charge that is repulsed by the negative rock surface charge.

6 Claims, 3 Drawing Sheets

US 10,894,913 B1

SURFACE BLOCKING AGENTS

CROSS-REFERENCE TO RELATED APPLICATION

This application claims priority to U.S. Provisional Patent Application No. 62/545,654, entitled "Surface Blocking Agents," filed Aug. 15, 2017, the disclosure of which is incorporated herein by reference in its entirety.

FIELD

The present disclosure is generally directed to enhanced oil recovery, and more particularly to chemical blocking agents that reduce the adhesion of oil to subterranean formations.

BACKGROUND

Enhanced oil recovery (EOR) is the implementation of various techniques for increasing the amount of crude oil that can be extracted from an oil field. Enhanced oil recovery is also called tertiary recovery (as opposed to primary and secondary recovery). According to the US Department of Energy, there are three primary techniques for EOR: thermal recovery, gas injection, and chemical injection. Sometimes the term quaternary recovery is used to refer to more advanced, speculative, EOR techniques. Using EOR, 30 to 60 percent, or more, of the reservoir's original oil can be extracted, compared with 20 to 40 percent using primary and secondary recovery.

Currently, EOR does not use chemicals to alter the surface chemistry of positively charged oil surface groups to prevent or reduce oil adhesion to negatively charged mineral surfaces and to increase the amount of oil recovered.

What is needed are surface blocking chemicals for enhanced oil recovery processes that improves oil recovery.

SUMMARY OF THE DISCLOSURE

The present disclosure is directed to chemical blockers that can be used in an enhanced oil recovery process to improve oil recovery.

According to an embodiment of the disclosure, a solution is disclosed that includes a solution medium and a blocker selected from a group consisting of blocker molecules and nanoparticles. The blocker molecules and nanoparticles comprise opposing negatively charged functional groups separated by an amount that sufficient in length and rigidity that the opposing negatively charged anionic functional groups cannot coordinate together to divalent cations.

According to another embodiment of the disclosure, an oil recovery method is disclosed that includes injecting a solution into a subterranean formation. The solution includes a solution medium and a blocker selected from a group consisting of blocker molecules and nanoparticles. The blocker molecules and nanoparticles comprise opposing negatively charged functional groups separated by an amount that is sufficient in length and rigidity that the opposing negatively charged anionic functional groups cannot coordinate together to divalent cations.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

The application will become more fully understood from the following detailed description, taken in conjunction with the accompanying figures, wherein like reference numerals refer to like elements, in which.

Wherever possible, the same reference numbers will be used throughout the drawings to represent the same parts.

DETAILED DESCRIPTION

Figure 1:
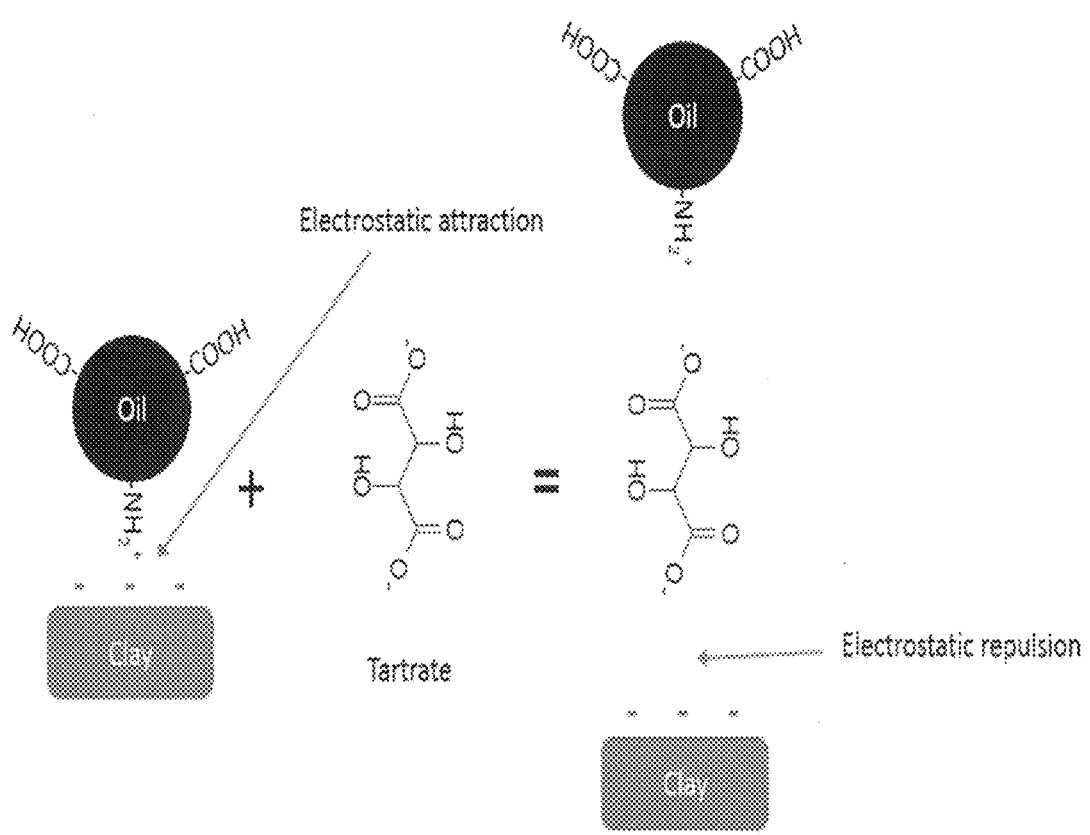
FIG. 1 illustrates the use of a blocker to decrease the attraction of oil to rock according to an embodiment of the disclosure.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Adhesion of petroleum to reservoir surfaces is largely determined by electrostatic interactions (for example, the cationic nitrogen bases of the oil attracted to the negatively mineral surfaces). The present disclosure is directed surface blockers, molecules and nanoparticles, that have opposing negatively charged functional groups, whose negative charges are physically separated (such as succinate or glucarate), that prevent or reverse adhesion by locally switching the interfacial charge of the oil. Because viruses have similar surface charge to oils, and cells are negatively charged like many minerals, the same surface blockers would prevent adhesion of viruses. Consequently, the blocking agents proposed to prevent or reverse oil adhesion might also be used as anti-viral medicines.

Most crude oils (>90%) are nitrogenous base-bearing substances. Crude oils with N-bases adhere to rock through electrostatic attraction of the positively charged N-base to a negatively charged group attached to the rock. On a rock surface in an oil reservoir, the negatively charged groups are most often mineral inorganic broken bonds.

The following disclosure is directed to surface blockers, injectates including surface blockers and methods for using surface blockers to block or reverse adhesion of N-base-bearing oil to a subterranean formation containing a reservoir to enhance oil recovery from that reservoir. The blockers are based on a molecular level understanding of oil detachment/adhesion from/to reservoir rock. The blockers change the local surface charge of oil that interacts with reservoir rock to reduce oil adhesion to the rock. The blockers are introduced into the reservoir via water, brine or other aqueous fluids that are injected into the reservoir. The blockers can then attach to reservoir oil from the introduced fluid and/or may migrate to connate waters before becoming attached to the oil.

The blockers may be, but are not limited to compounds and nanoparticles that include opposing negatively charged functional groups that both link to the positively changed nitrogen (N)-base of an oil molecule and electrostatically repel a negatively charged rock substrate. When the blocker is a nanoparticle, the negatively charged functional groups may be clusters of one or more functional groups so long as the distance between the clusters is sufficient in length and rigidity that the two opposing groups cannot coordinate together to divalent cations (see requirements below).

The blockers agents have the following characteristics:
1. Exposed functional groups are negatively charged, that is anionic, at oilfield pHs (pH >4), and
2. The anionic groups have a single negative charge, and
3. The anionic groups are not immediately adjacent to one another.

In addition, the blockers must have:
1. a negatively charged (anionic) functional group that links to the positively charged N-base of oil,
2. a negatively charged functional group that will electrostatically repel the negatively charged rock surface, and
3. a molecular chain, macromolecule, or nanoparticle separating the two charged functional groups sufficient in length and rigidity that the two anionic end groups cannot coordinate together to divalent cations such as $Ca^{+2}$.

FIG. 1 illustrates the use of a blocker to decrease the attraction of oil to rock. As can be seen in FIG. 1, a blocker, in this case, tartrate, is introduced into an oil reservoir and attaches to an oil macromolecule surface and causes the oil macromolecule to be separated from the rock, in this case clay, by electrostatic repulsion.

Figure 2:
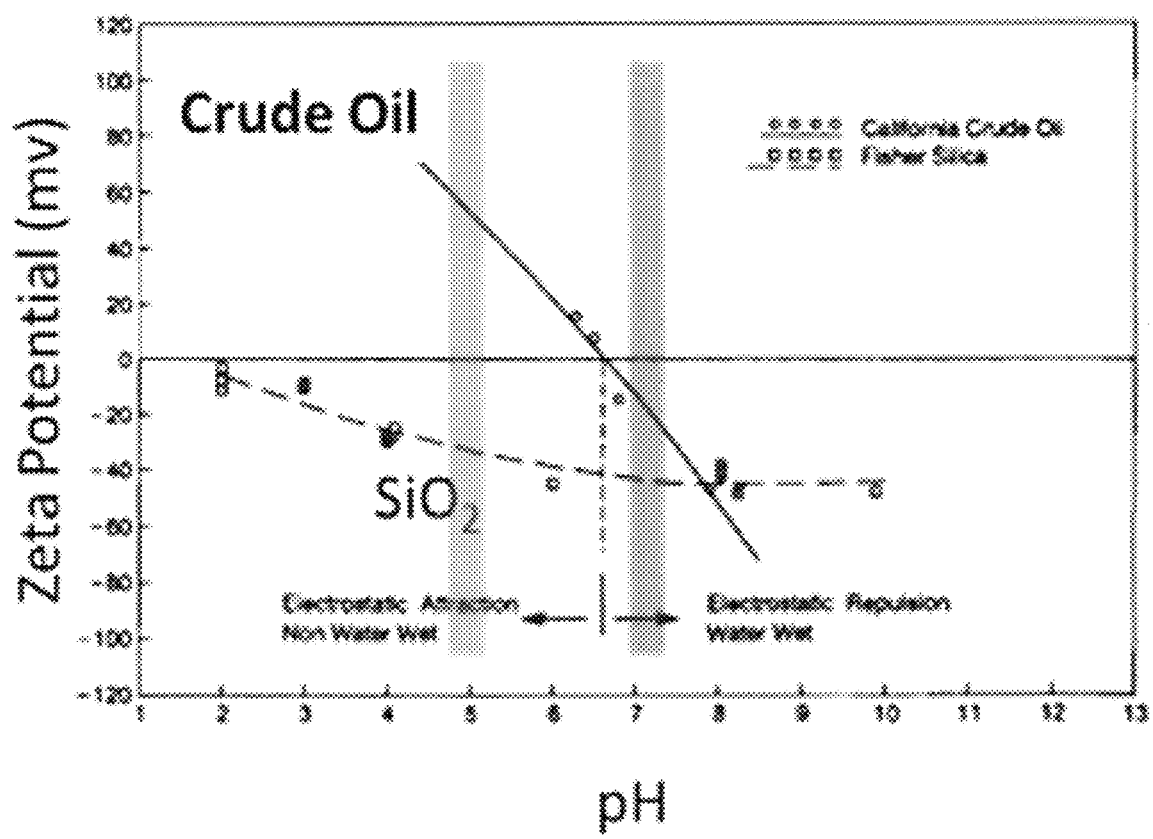
FIG. 2 is a schematic showing oil and rock surface charge, in this example for quartz sand, as a function of pH.

FIG. 2 is a schematic showing oil and rock surface charge, in this example for quartz sand, as a function of pH. As can be seen, the oil is positively charged because of the presence of $-NH^+$ groups below pH~6.5; above pH 6.5, the oil surface is negatively charged because of the presence of carboxylate groups. Quartz surface is negatively charged above pH 2 because of $>Si-O^-$ quartz surface groups. Below pH 6.5, crude oil adsorbs to quartz through the electrostatic attraction reaction, $>SiO^-+Oil-NH^+ =>SiONH-Oil$. A thin layer of water separates the sand and the oil. Raising the pH in this thin water layer above pH 6.5 prompts the desorption of the oil. That is, the reaction above moves from right to left at high pH. To release more oil from a quartz sand reservoir means either raising the pH, or blocking the $>SiONH-Oil$ reaction with a chemical agent introduced into the thin water layer. Oil-reservoir adsorption mechanisms in more mineralogically complex reservoirs containing clays or carbonate minerals are described in U.S. Pat. No. 8,812,271 (Brady and Krumhansl, 2014). The present disclosure includes introducing blockers, such as tartrate in a waterflood, thereby causing it to enter the thin water layer separating oil and reservoir rock and attach itself to oil $-NH^+$ groups causes oil release because it locally reverses the charge on the oil surface causing it to be electrostatically repelled from the rock.

According to an embodiment of the disclosure, the surface blocking agents may be linear diprotic molecules. Linear diprotic molecules are linear molecules with an anionic head-group at either end. In an embodiment, the anionic groups include $R-COO^-$, $R-S^-$, $R-SiO_3^-$, and $R-SO_3^-$; respectively carboxylate, sulfide, silicate, and sulfonate groups. R denotes the macromolecule the functional group is attached to. R can be an organic chain with a minimum of two carbon links, or a nanoparticle. In an embodiment, the anionic group may be an organic acid, but can also be other attached acids that have lost their $H^+$ and are therefore negatively charged. Examples of linear diprotic organic acids, organic molecules with 2 or more organic acid groups separated from each other by a linear hydrocarbon chain. In an embodiment, the anionic group may be carboxylates, for example, succinate, and tartrate.

Figure 3:
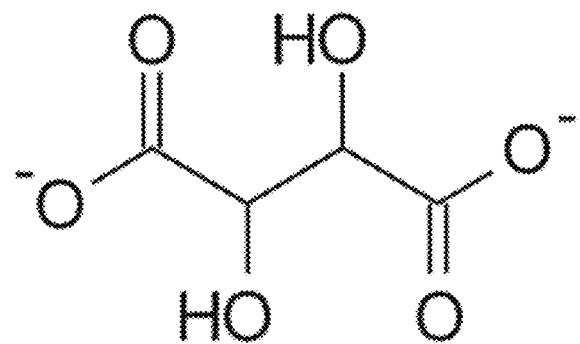
FIG. 3 illustrates an example of a blocker, where the anionic groups are carboxylates and R is an organic chain, tartrate, according to an embodiment of the disclosure.

FIG. 3 illustrates an example of a blocker where the anionic groups are carboxylates and R is an organic chain, tartrate. The tartrate may be introduced into an injectate or an injectate precursor solution by adding sodium tartrate to the solution. Other introduction forms are available as would be understood by one of ordinary skill in the art.

Figure 4:
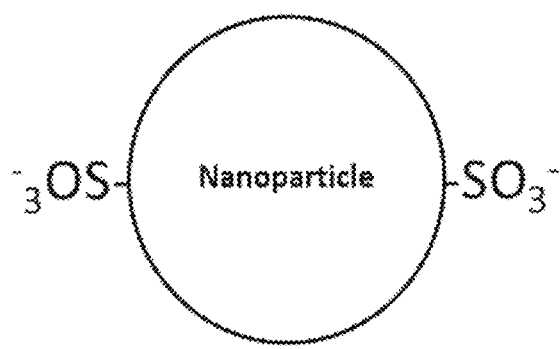
FIG. 4 illustrates an exemplary blocker nanoparticle according to an embodiment of the disclosure.

According to another embodiment of the disclosure, the blockers are nanoparticles having attached opposing anionic groups having a single negative charge. The anionic groups are the same as for the linear diprotic organic chains. The nanoparticle may be a metal, ceramic or organic particle. For example, the ceramic containing particle may be silica, alumina, titania, or other metal (hydr)oxide. In an embodiment, the nanoparticle may have a size of between 1 and 100 nanometers. FIG. 4 illustrates an exemplary blocker nanoparticle. As can be seen in FIG. 3, the nanoparticle includes opposing sulfonate functional groups.

According to another embodiment of the disclosure, reservoir injectate is formulated that includes one or more of the above disclosed blockers. In an embodiment, the injectate may be a fracking fluid. The injectate is an aqueous fluid that may be fresh water, a brine, or a chemically modified fresh water or brine. The blockers may be introduced into the injectate or an injectate precursor solution by adding sodium tartrate to the solution. Other introduction forms are available as would be understood by one of ordinary skill in the art. Blockers are present in the solution in an amount between 10 mg/l and 10,000 mg/l. In another embodiment, the blockers may be present in the solution in an amount between 100 mg/l and 1000 mg/l.

According to another embodiment of the disclosure, methods to increase oil recovery by injecting or introducing an injectate that includes one or more of the above disclosed blockers into an oil reservoir are disclosed.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method, comprising:
   injecting a solution into a subterranean formation, wherein the solution comprises:
   a solution medium; and
   a blocker selected from a group consisting of blocker molecules and nanoparticles;
   wherein the blocker comprises opposing negatively charged anionic functional groups separated by an amount that is sufficient in length and rigidity that the opposing negatively charged anionic functional groups cannot coordinate together to divalent cations; and
   wherein the blocker is a nanoparticle and the opposing negatively charged anionic functional groups are selected from a group consisting of carboxylate, sulfide, silicate, and sulfonate groups.

2. The method of claim 1, wherein the solution further comprises blocker molecules selected from a group consisting of succinate and tartrate.

3. The method of claim 1, wherein the solution medium is water.

4. The method of claim 1, wherein the nanoparticle further comprises a base substrate selected from a group consisting of metal, ceramic or organic particle.

5. The method of claim 4, wherein the ceramic is selected from a group consisting of metal oxides and metal hydroxides.

6. The method of claim 5, wherein the metal oxide is selected from the group consisting of silica, alumina and titania.

\* \* \* \* \*